United States Patent [19]
Blair et al.

[11] Patent Number: 5,859,984
[45] Date of Patent: *Jan. 12, 1999

[54] HDLC ASYNCHRONOUS TO SYNCHRONOUS CONVERTER

[75] Inventors: Dana Lynn Blair, Raleigh, N.C.; Gordon Taylor Davis, Boca Raton, Fla.; Cloyd Stanley McIlvaine, Durham, N.C.

[73] Assignee: International Business Machines Corporation, Armonk, N.Y.

[ * ] Notice: The term of this patent shall not extend beyond the expiration date of Pat. No. 5,586,273.

[21] Appl. No.: 695,279

[22] Filed: Aug. 6, 1996

Related U.S. Application Data

[63] Continuation of Ser. No. 292,563, Aug. 18, 1994, Pat. No. 5,586,273.

[51] Int. Cl.$^6$ .................................................. H04L 27/02
[52] U.S. Cl. ............... 395/285; 395/200.63; 395/200.78; 395/831
[58] Field of Search .................................... 395/285, 206, 395/200.2, 200.13, 200.19, 831, 850, 881

[56] References Cited

U.S. PATENT DOCUMENTS

| | | | |
|---|---|---|---|
| Re. 345,536 | 3/1994 | Frimmel, Jr. ............................. | 379/88 |
| 4,700,358 | 10/1987 | Duncanson et al. ......................... | 375/8 |
| 4,817,147 | 3/1989 | Gorniak et al. ............................ | 380/49 |
| 4,823,304 | 4/1989 | Frantz et al. ............................ | 364/900 |
| 5,054,020 | 10/1991 | Meagher ................................... | 370/48 |
| 5,099,478 | 3/1992 | Bremer et al. ........................ | 370/100.1 |
| 5,214,650 | 5/1993 | Renner et al. ........................ | 370/110.1 |
| 5,239,544 | 8/1993 | Balzano et al. .......................... | 370/370 |
| 5,586,273 | 12/1996 | Blair et al. .............................. | 395/285 |

OTHER PUBLICATIONS

IBM Technical Disclosure Bulletin V.37, No. 02A Feb. 1994 "Dynamic ISDN Data Link Control/Synchronous Data Link Control Protocol" M. E. Fisher et al.

Primary Examiner—Meng-Ai T. An
Assistant Examiner—Jigar Pancholi
Attorney, Agent, or Firm—Joscelyn G. Cockburn

[57] ABSTRACT

Communication, using a synchronous protocol, over a synchronous communications link, between synchronous application programs executed on a terminal (i.e., personal computer, PC) with an asynchronous byte-oriented interface and a PC with a synchronous frame orientated interface is made possible by enhancing the PC with the asynchronous byte-oriented interface with a device which modifies the data to be transmitted by inserting framing flags and transparency characters before the data passes through the COMM port (asynchronous byte-oriented interface) and extracting the transparency characters after the data exits the COMM port. As a consequence, the PC with the frame-oriented interface does not have to be modified.

3 Claims, 11 Drawing Sheets

HDLC PROTOCOL LAYER TO
HDLC / ASYNC MAC

HDLC / ASYNC MAC TO ADLC TASK

ADLC TASK TO BMAC TASK

BMAC TO PEER B - CHANNEL MAC

PEER B - CHANNEL MAC TO
PEER HDLC PROTOCOL LAYER

PEER HDLC PROTOCOL LAYER TO
PEER B - CHANNEL MAC

PEER B - CHANNEL MAC TO BMAC TASK

BMAC TASK TO ADLC TASK

ADLC TO HDLC / ASYNC MAC

HDLC / ASYNC MAC TO
HDLC PROTOCOL LAYER

HDLC ASYNCHRONOUS TO SYNCHRONOUS CONVERTER

This is a continuation of application(s) Ser. No. 08/292,563 filed on Aug. 18, 1994 U.S. Pat. No. 5,586,273.

BACKGROUND OF THE INVENTION

1. Field of the Invention

This invention relates to the field of data communications in general and more particularly to communications between computers which are connected via elements of wide-area networks. Such networks may be either public or private, and may support only data communications or a mixture of data, video and audio (voice) communications.

2. Prior Art

The use of communications networks to disseminate information is well known in the prior art. A conventional communications network includes a plurality of data terminal equipment (DTE) interconnected by a transmission network. The DTE may include a plethora of devices including computers, telephone, workstations, file servers or the like. Likewise, the transmission network may include a plethora of signal transmission media including optical fiber, conduction wires, wireless media satellite or the like. The sine-qua-non of a good communications network is the ease with which a DTE, sometimes called a station, can communicate with another station in the network. This condition is often called interoperability. The prior art has fostered interoperability by establishing standards.

Among the faster growing type of DTEs which can be connected in a communications network are Personal Computers (PCs). The communications capabilities of personal computers have evolved around industry standards for asynchronous communications, based on a specific asynchronous communications component, the INS8250A manufactured by National Semiconductor Corporation, also referred to as a Universal Asynchronous Receiver/Transmitter (UART). The UART has been connected to industry standard personal computers (PCs) using specific addresses within the PCs input/output address range. Specific PC interrupt levels have also been assigned to connect to the UART, in order to provide more efficient feedback to the PC of the current state of the communications component. The interface between the PC and the UART, consisting of a range of addresses and a PC interrupt level, are referred to in the industry as a communications port or COMM port. A typical PC will define one or more COMM ports by reserving blocks of addresses within its input/output address range, along with the interrupt level(s) typically associated with asynchronous communications.

The COMM port interface is capable of handling only one byte of data at a time. Typically, an interrupt is generated after each byte of data has been transmitted or received, notifying the PC that the UART is ready to transmit the next byte, or that the PC should read the most recently received byte. Some extensions to the standard COMM port have been developed which allow multiple bytes to be processed with a single interrupt by making use of a small buffer memory. In either case, the PC interrupt response time gates the rate at which a COMM port can transmit and receive data, and depending on the data rate used for communications and processing requirements of other programs running in the PC, may prevent the PC from providing data as fast as the communications link can handle it. Typically, the transmit process is more affected by this problem because it is typically allocated a lower priority interrupt than that assigned to the receive process. This limitation does not present a problem with asynchronous transmission since each byte is processed as an independent entity. The UART will send "marks" (logic 1) between transmitted bytes, and can fill in the time between bytes with as many "marks" as necessary.

However, throughput limitations of a COMM port interface do present a significant problem for synchronous communications. Whereas asynchronous communications processes each byte of data as an independent entity, synchronous communications protocols must process an entire message or frame as the smallest data structure which can be independently handled. Consequently, once a communications device starts transmitting a message using synchronous protocol, it must continue to process the entire message without interruption. Interrupt response times associated with a COMM port interface would typically interrupt a message before completion by failing to transfer data as quickly as required.

Because of this limitation, most data communications used by personal computers is asynchronous. Numerous asynchronous communications applications and terminal emulation programs have been developed for PCs which depend on the COMM port interface to communications hardware. Larger computers do not have the limitations of a COMM port interface, and often use synchronous communications because of lower overhead and better error control procedures.

FIG. 9 illustrates a straightforward synchronous connection using synchronous communications hardware in each station. For purposes of discussion, each station is represented by a layer nomenclature similar to the one used by the ISO standard. This method of representing a station is well known in the technology and further discussion of the respective layers will not be given. Station 1 communicates with station 2 over transmission link 3. This is a balanced system in that the station 1 device and station 2 device have identical numbers of layers. Stated another way, each unit performs the same type of operation on a synchronous frame in order to exchange information between the stations. It should be noted that the HDLC MAC layer performs frame check sequence (CS) generation and checking, data transparency modifications (HDLC 0 insertion/deletion) and flag generation and checking.

Protocol converters have been developed by numerous equipment suppliers. The protocol converters convert an asynchronous protocol into a synchronous protocol, in order to enable a PC with asynchronous communications capabilities to connect to a host computer which only supports synchronous communications. U.S. Pat. No. 5,054,020, U.S. Pat. No. Re. 34,536 and U.S. Pat. No. 5,239,544 are cited as examples of protocol converters. U.S. Pat. No. 4,700,358 is also cited as an example of a protocol converter which is imbedded within the asynchronous communications hardware of a PC. Although the present invention to be described hereinafter exhibits some of the characteristics of a protocol converter, it will be clear from the detailed description that it is not a protocol converter. Specifically, a protocol converter is designed to allow an asynchronous client PC application to communicate with a synchronous host application, whereas the present invention is designed to allow two synchronous applications executing on different PCs to communicate, even though one of those applications must interface to its communications hardware through an asynchronous COMM port.

In addition, means have been devised which allow two synchronous applications to communicate in spite of having a COMM port as the interface to communications hardware. This is accomplished by inserting special control characters in the data stream which allow identification of the beginning and end of a framed message even when individual bytes making up the message are transmitted independently and asynchronously with possible time delays between bytes. International Standards Organization (ISO) standard 3309 describes a means of communicating across an asynchronous start/stop link using synchronous HDLC framing.

Likewise, publication RFC-1294 describes a similar technique which adapts synchronous TCP/IP messages to an asynchronous start/stop link. Both of these implementations are examples of a balanced system, meaning that both communicating devices must implement the same functions in order to communicate. FIG. 10 illustrates such a communications environment. The prior art communications environment in FIG. 10 illustrates HDLC/Async node to node communications. In this environment, station 4 is communicating over transmission link 6 to station 5. As in FIG. 9, station 4 and station 5 are based upon the OSI reference model in which different layers are used to represent the function of a device, such as a PC, and the adapter which connects the PC to the transmission link. In FIG. 10, the adapter and COMM port would be part of the physical layer. The HDLC/Async MAC layer replaces the HDLC MAC layer of FIG. 9. The HDLC/Async MAC layer retains the integrity of the entire packet while allowing the packet to be transmitted 1 byte at a time. This is done by inserting a flag byte at the beginning and end of the packet and converting special bytes within the packet. The conversion will be described later.

As with FIG. 9, FIG. 10 is also a balanced system in that the number of functions performed on a data frame in each station are identical. Consequently, the number of layers in station 4 and station 5 are equivalent or identical. In an actual communications network, in order for synchronous application programs to communicate with each other using a synchronous protocol, both communicating devices must implement the same function. This creates unnecessary hardship in that it requires the user to make adjustments to pre-existing devices.

Therefore, what is required is a mechanism and/or procedure which allows unbalanced stations to communicate. As is used herein, stations are unbalanced if the PC and associated communications devices perform different sequence of operations than the operations performed in a paired PC. It is this deficiency that the present invention (to be described hereinafter) addresses.

SUMMARY OF THE INVENTION

Therefore, it is a primary object of the present invention to provide interoperability between unbalanced stations. As a consequence, synchronous applications running in each station can communicate.

It is still another object of the present invention to allow an asynchronous device to communicate, using a synchronous protocol, with a synchronous device without changes to the synchronous device.

In particular, the asynchronous device is comprised of a system (such as a PC) and a communications adapter (such as an ISDN adapter or a modem) which couples the system to a wide area communications network (such as an ISDN network or public switched network). A COMM port interconnects the system and the adapter. HDLC/Asyn MAC Layer functions (hereafter called Asynchronous Framer) are provided in the system to receive frames from application programs, modify the frames for transparency (to be described below) and sends the modified frame through the COMM port to the adapter. Synchronous framing functions (to be described below) are provided on the adapter to remove the transparency and format the frame in accordance with a synchronous protocol for transmission over the wide area communications network to a receiving station.

In general the invention covers an apparatus and method for retrofitting a synchronous workstation or the like, whose usual (regular) way of communicating with other devices in a communications network is through an asynchronous port with an asynchronous protocol and asynchronous application programs, to execute synchronous application programs and communicate with a synchronous workstation using a synchronous protocol. The device includes a first layer preferably provided above the layer of the asynchronous port to insert controlled characters which cause a synchronous frame provided by the synchronous applications to be transmitted through the asynchronous port (such as COMM port), an ADLC task and a BMAC task inserted below the asynchronous port layer for extracting the control character and to insert frame characters which enable the synchronous frame to be transmitted via a synchronous protocol to another (receiving) workstation whose normal way of operation is to process synchronous frames. As a consequence, the receiving workstation (called synchronous station) need not change its normal way of operating to communicate with an asynchronous station.

The foregoing features and advantages of this invention will be more fully described in the accompanying drawings.

DETAILED DESCRIPTION OF THE PREFERRED EMBODIMENT

Figure 1:
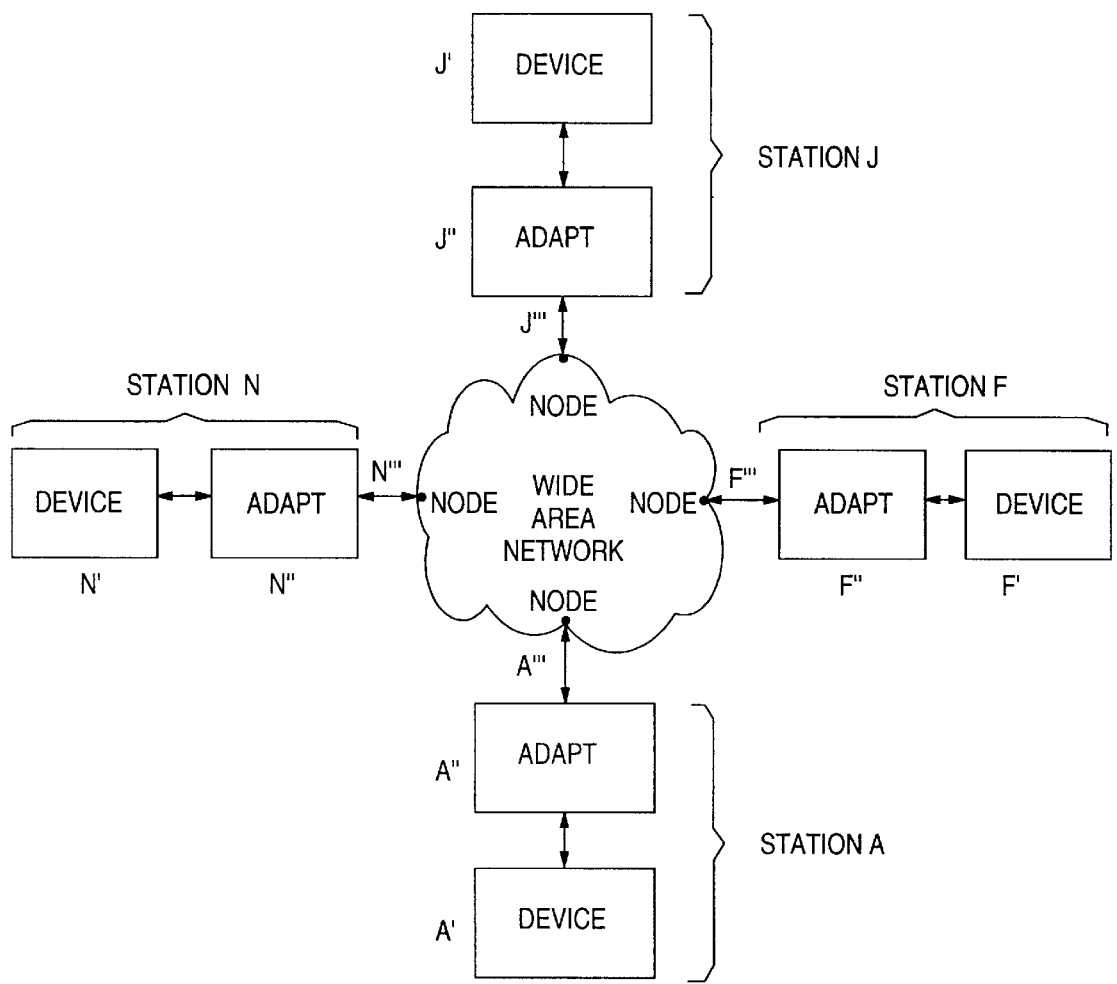
FIG. 1 shows a block diagram of a communications network in which the teachings of the present invention can be used.
Figure 3:
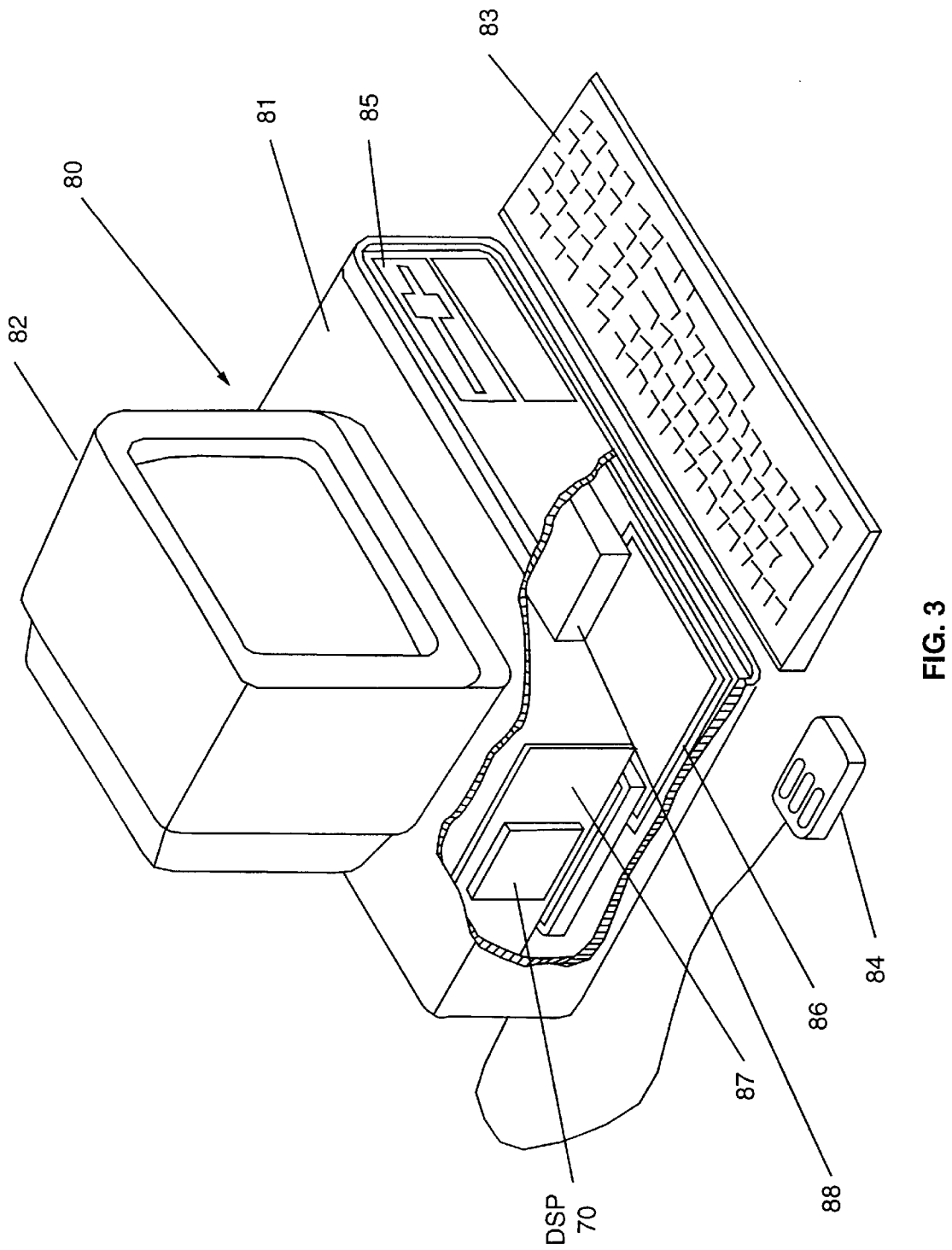
FIGS. 3 and 3A show pictorial representations of a station.
Figure 3A:
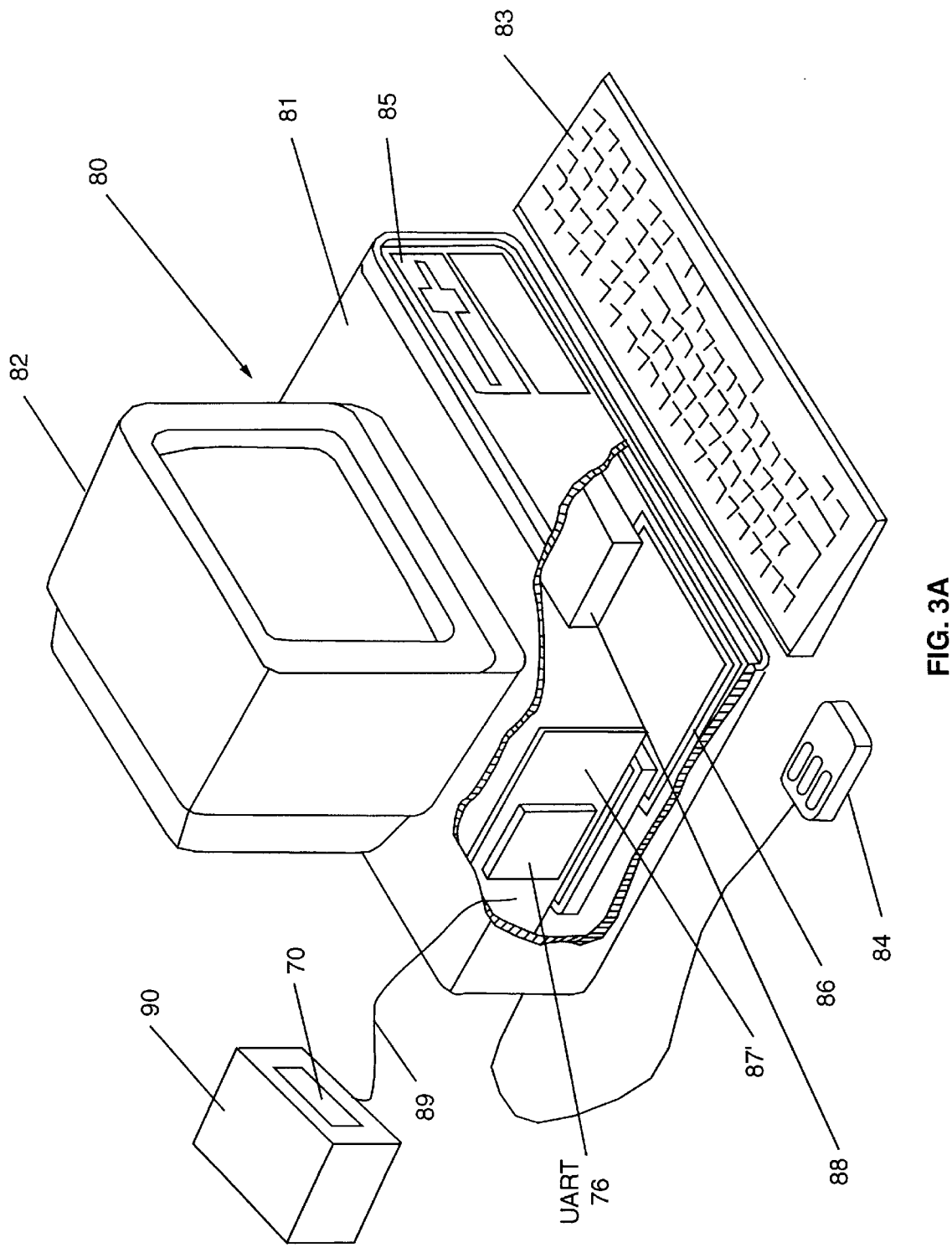

FIG. 1 shows a communications network in which the teachings of the present invention may be used. The communications network includes a plurality of stations (A . . . F . . . J . . . N) interconnected by a transportation network such as a Integrated Services Digital Network (ISDN)

network or other types of wide area network. The ISDN network is a synchronous network well known in the prior art and further description will not be given. Each station is comprised of a device such as a personal computer, an adapter (ADPT) and a transmission link interconnecting the station to a node of the ISDN network. Even though the preferred embodiment is described in an ISDN, it should be obvious to those skilled in the art that other types of wide area networks could be used. As is used in this application, a node indicates an insertion point into the ISDN network. By way of example, station A includes devices A', adapter A" and transmission link A'" interconnecting adapter A" to a network node. The other stations in the network are similarly structured. It is worthwhile noting that even though adapter A" and others are shown as separate units from the device which they couple to the network, in reality, the adapter may be under the covers of the device (FIGS. 3 and 4) which it attaches to the network or in a separate external box (FIGS. 3A and 4A). In case of a PC, a slot in the PC is provided for the adapter. In addition, station A could be an asynchronous station while station F is a synchronous station and the present invention (to be described hereinafter) allows station A to communicate with station F even though the functions provided in some of the layers of station A are different from those provided in the layers of station F. This is referred to as an unbalanced system. The present invention enables communication between unbalanced stations.

Figure 2:
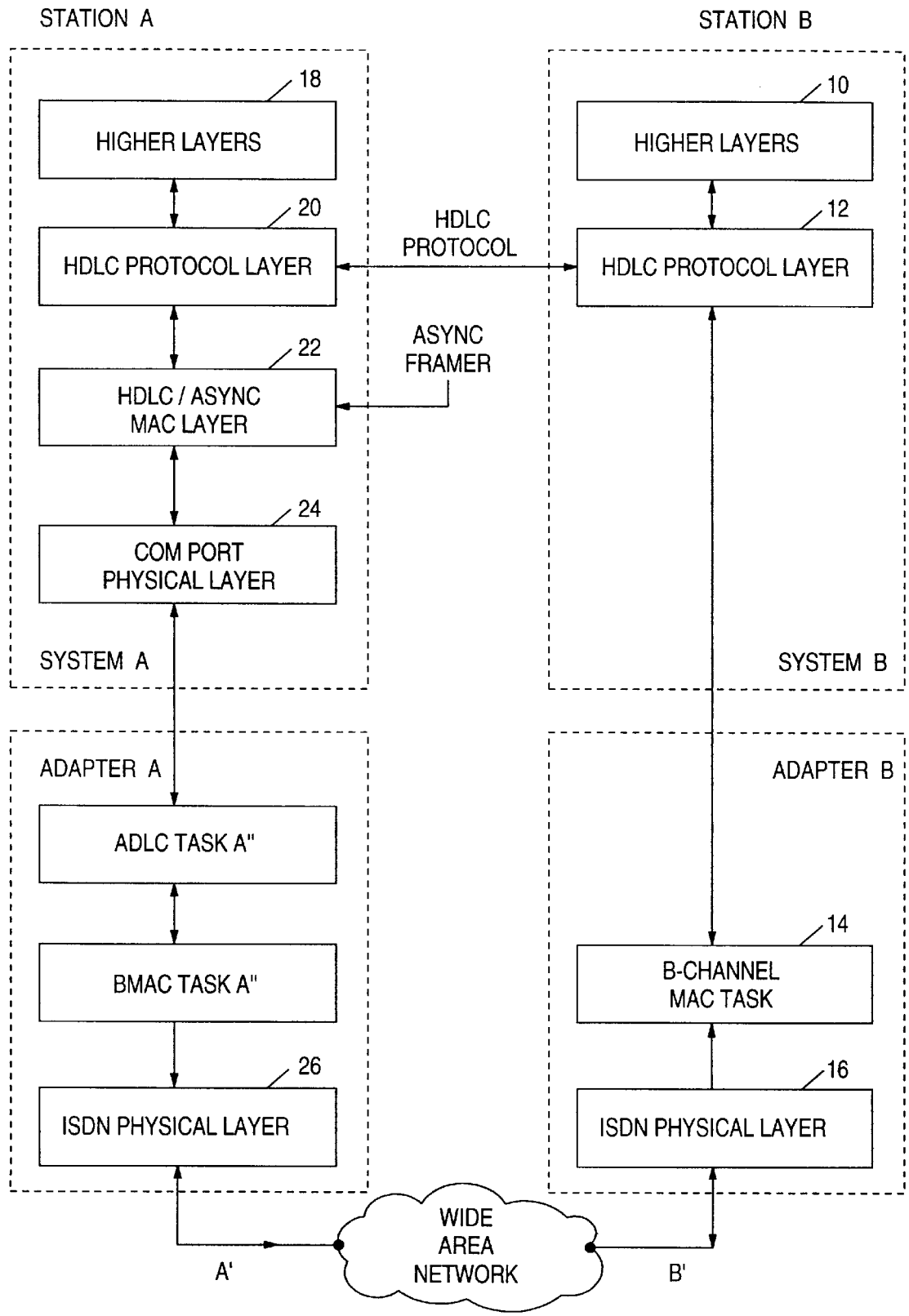
FIG. 2 shows a graphical representation of a communications system according to the teachings of the present invention.

FIG. 2 shows a conceptual representation of the unbalanced system according to the teachings of the present invention. In FIG. 2 station A and station B are represented by the previously discussed layer symbols which are modeled to a certain extent after the ISO standard. Each layer provides functions which allow a message generated by synchronous applications running on top of the Higher Layers to communicate through a COMM port of an asynchronous station A with a synchronous station B using a synchronous protocol such as HDLC protocol. The HDLC protocol is a well known protocol and, as such, further discussion of the protocol will not be given.

Still referring to FIG. 2, the unbalanced system includes station A which is connected by transmission link A' to ISDN network which couples station A to transmission link B' which, in turn, is connected to station B. Conceptually, the broken line in station A and station B indicates the separation between the system which, in the preferred embodiment, is the PC and the adapter which couples the PC to the ISDN network. Still referring to FIG. 2, station B is a synchronous station and includes block 10 which represents the Higher Layers of the PC. This layer includes an application program which would operate on an operating system. Since these layers are well known in the computer art, a detailed description will not be given. Suffice it to say that the application layer contains at least one application program running on top of an operating system. The at least one application program generates synchronous messages and delivers them to Lower Level Layers for delivery to another station in the network. The Lower Layers below layer 10 includes layer 12, which is the HDLC protocol layer and others. The HDLC Protocol Layer 12 provides the capability for bit synchronous communications over a network.

The station B also includes adapter B which includes the ISDN Physical Layer 16. The physical layer 16 is a combination of integrated circuit chips and programs running in the Digital Signal Processor DSP which provides connections to the ISDN network. The B Mac task (Block 14) is described hereinafter.

In operation, station B has an application program which provides a message which is processed by the various layers in the station and the adapter and is delivered onto the ISDN network for delivery onto another station. In addition, station B receives a frame from the ISDN network. The frame is processed by the above-described layers and the message is delivered to the application program. Station B is similar to other synchronous-type stations and, as such, further description will not be given.

Still referring to FIG. 2, station A is an asynchronous station comprised of a System A and an Adapter A for connecting the system to transmission link A'. The System A is represented by Higher Layers 18 which include application programs which generate synchronous message for delivery to synchronous station B. Below the Higher Layers are HDLC Protocol Layer 20, HDLC/Async MAC Layer 22 and COMM Port 24. The Physical Layer includes the COMM port which, as stated before, is an asynchronous port. The HDLC/Async MAC layer is referred to hereinafter as the Async Framer. As will be described hereinafter, the Async Framer receives a frame from the HDLC protocol layer and inserts characters which allow it to pass through the COMM port to the adapter.

The Adapter A, in FIG. 2, couples the station to the transmission link A'. The adapter comprises ADLC Task A" B MAC Task A" and the ISDN Physical Layer 26. In order to process a frame outputted from the COMM port of System A so that it can be transmitted synchronously to station B, a Sync Framer A", including an Asynchronous Data Link Control (ADLC) Task A" and a B MAC Task A", is added to the adapter. Functionally, the ADLC Task A" removes transparent characters which were added to the frame so that it could be transported through the COMM port of the system and add predetermined characters so that the frame can be transported using a synchronous protocol through a synchronous network to Station B.

Details of the B MAC Task A" will be given hereinafter. It should be noted that in each of the station A and station B, even though the lines interconnecting each layer is shown as a single line, in reality, they represent busses which include a plurality of lines, each set of lines representing a channel over which the system transmits data onto the ISDN network and another set of lines forming a channel over which the station receives information from a remote station.

In view of the above, in order for communication to be effectuated between different types of stations (unbalanced) in a communications network, applicants' invention requires the addition of an Asynchronous (Async) Framer and a Synchronous (Sync) Framer to the station using a COMM port.

Figure 5A:
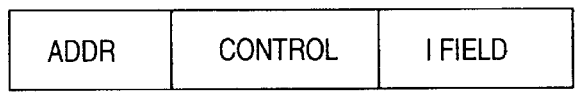
FIGS. 5A–5E show frame structure (format) for messages at different points of a transmit channel of a station connected to the network.
Figure 5B:
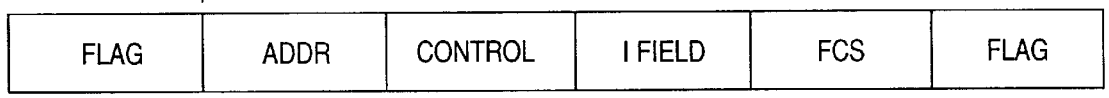

FIGS. 5A–5E show an HDLC frame flow from an application program running in station A to peer station B. The figures show the frame pattern or format as the frame is transmitted through various layers of station A. The FIGS. 5A–5E are best understood if reviewed simultaneously with FIG. 2. To this end, FIG. 5A shows the frame which is transmitted from the HDLC Protocol Layer 20 to HDLC/Async MAC Layer 22 (Async Framer). The frame in FIG. 5A was received in the HDLC Protocol Layer from an application program running in the Higher Layers. The frame includes an address field which contains the address of the peer station B, a control field for carrying control information and a I field for carrying the message (Information) to be transmitted to the peer Station B. The Async Framer 22 processes the frame (FIG. 5B) by adding leading and trailing flag fields carrying data pattern indicating the beginning and end of the frame. The Async Framer also adds the Frame Check Sequence (FCS) field and adjusts the respective field between the flags for data transparency.

The frame is then transported (FIG. 5B) through the COMM port to the ADLC Task A" (FIG. 2). The ADLC Task A" removes the flag field and data transparency and forwards the frame (FIG. 5C) to the B MAC Task A" (FIG. 2). The B MAC Task performs the following function on the frame: Flag/generation recognition, HDLC zero insertion/de-insertion, abort frame detection. All frames which are aborted are discarded by the ADLC Task. As to whether or not the B MAC Task concatenates the flag to the frame or strip the flag from the frame, depends on which direction the frame is flowing, i.e., whether the frame is being received from the ISDN network or being transmitted to said ISDN network. If the frame is being transmitted to the network, the flag is generated and appended to the message. If the message is received from the synchronous peer station via the network, the flag is recognized and removed. FIG. 5D shows the frame which is prepared by the B MAC Task (FIG. 2) and transmitted to transmission link A'. The frame passes through physical layer of Station B to B-Channel MAC Task whereat the flag and FCS fields are stripped, the zero insertion is removed and the frame (FIG. 5E) is forwarded to the HDLC protocol layer 12 of the station B whence it is transmitted to the application program being executed on top of the Higher Layers.

Figure 6A:
FIGS. 6A–6E show frame structure (format) for messages at different points in the receive channel of the station.
Figure 6B:
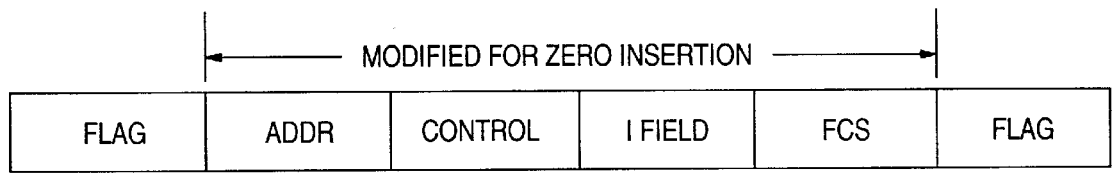
Figure 6C:
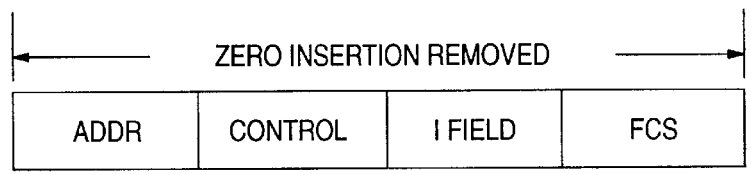
Figure 6D:
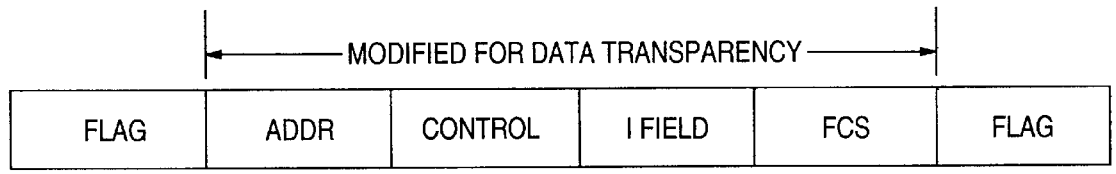
Figure 6E:
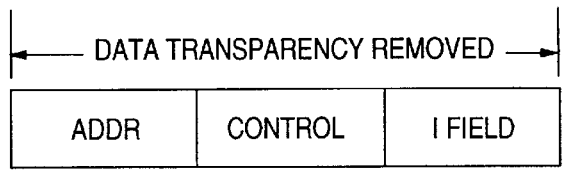

FIGS. 6A–6E show the HDLC frame flow from peer station B to station A. Similarly, the frames of FIGS. 6A–6E are more meaningful if reviewed with FIG. 2. FIG. 6A shows a frame as it is delivered from an application program running on top of the Higher Layers 10 to HDLC Protocol Layer 12 (Station B, FIG. 2). The frame is then delivered to the B-Channel MAC Task where the frame is adjusted as is shown in FIG. 6B (by adding flag field, FCS field and modified for zero insertion). The frame is delivered to the B MAC Task A" through the network. The B MAC Task A" removes the flag fields. In addition, the zero insertion is also removed. The frame, shown in FIG. 6C, is then delivered to the ADLC Task A" of the Sync Framer A". Since this is a receive frame, the ADLC task gets a complete frame (flags removed) from the B MAC Task A", adds the data transparency, adds flags and passes the frame through the COMM port to the HDLC/Async MAC Layer. This frame is shown as FIG. 6D. The HDLC/Async MAC then removes data transparency, the flag fields and FCS fields and forwards the frame (FIG. 6E) to the HDLC protocol layer from whence it is transmitted to the application program running on top of the Higher Layers 18 in Station A, FIG. 2.

An implementation according to the teachings of the present invention will now be given. The implementation is within the processor based computer system 80, FIG. 3. Computer system 80 includes display 82, disk drive and floppy disk drive 85, keyboard 83 and mouse 84. Housing 81 encloses various computer hardware (not shown) typical of processor-based computing systems. Within housing 81, CPU (central processing unit) 88 is coupled via bus 86 to adapter 87 on which digital signal processor (DSP) 70 is mounted. A connector on adapter 87 couples the computer system 80 to the ISDN communications network, previously described.

In an alternate embodiment (shown in FIG. 3A), adapter 87 could be connected via a serial digital interface UART 76 and cable 89 to external box 90 containing DSP 70. Cable 89 is connected to a connector on adapter 87.

Figure 4:
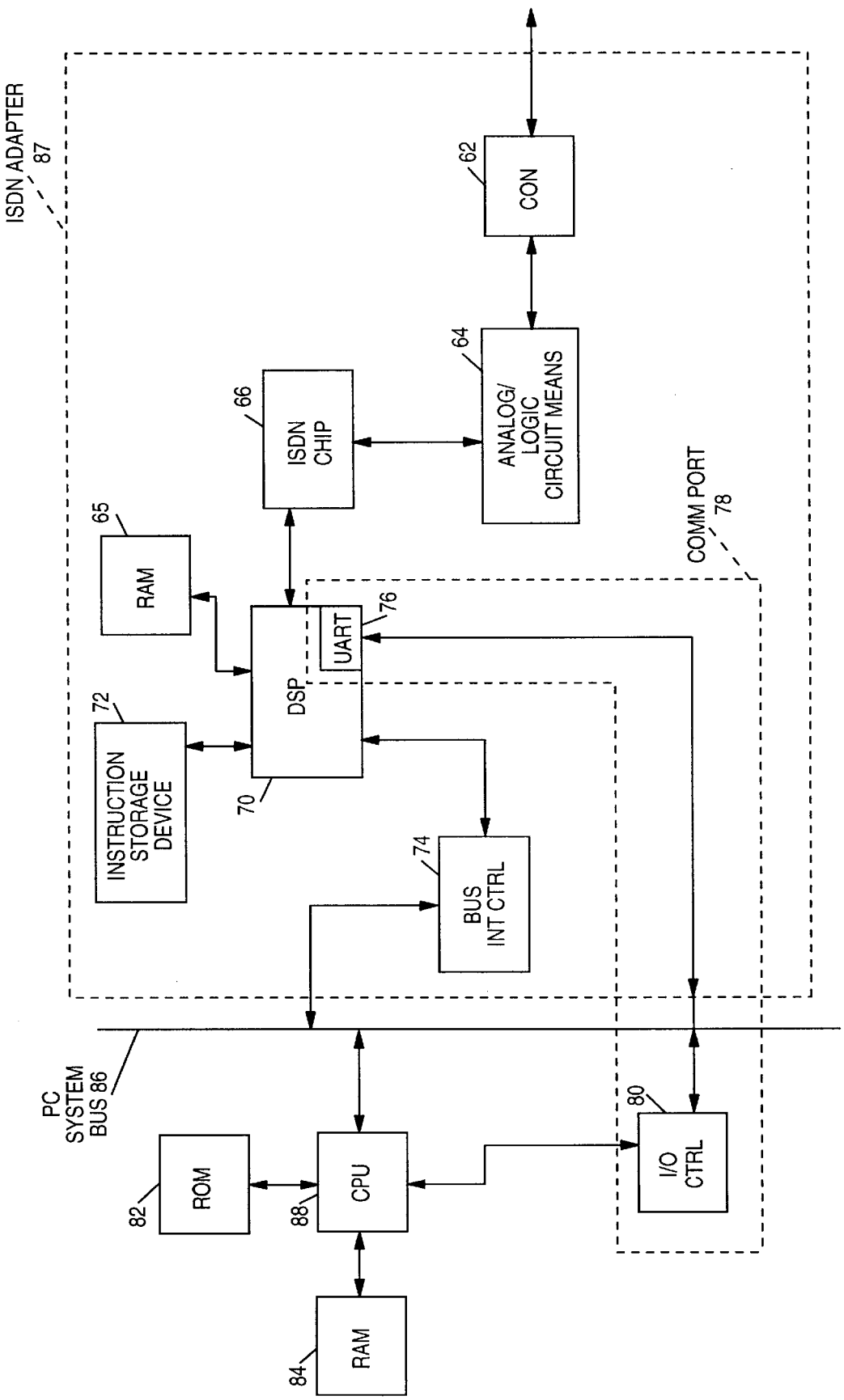
FIGS. 4 and 4A show block diagrams of a station.
Figure 4A:
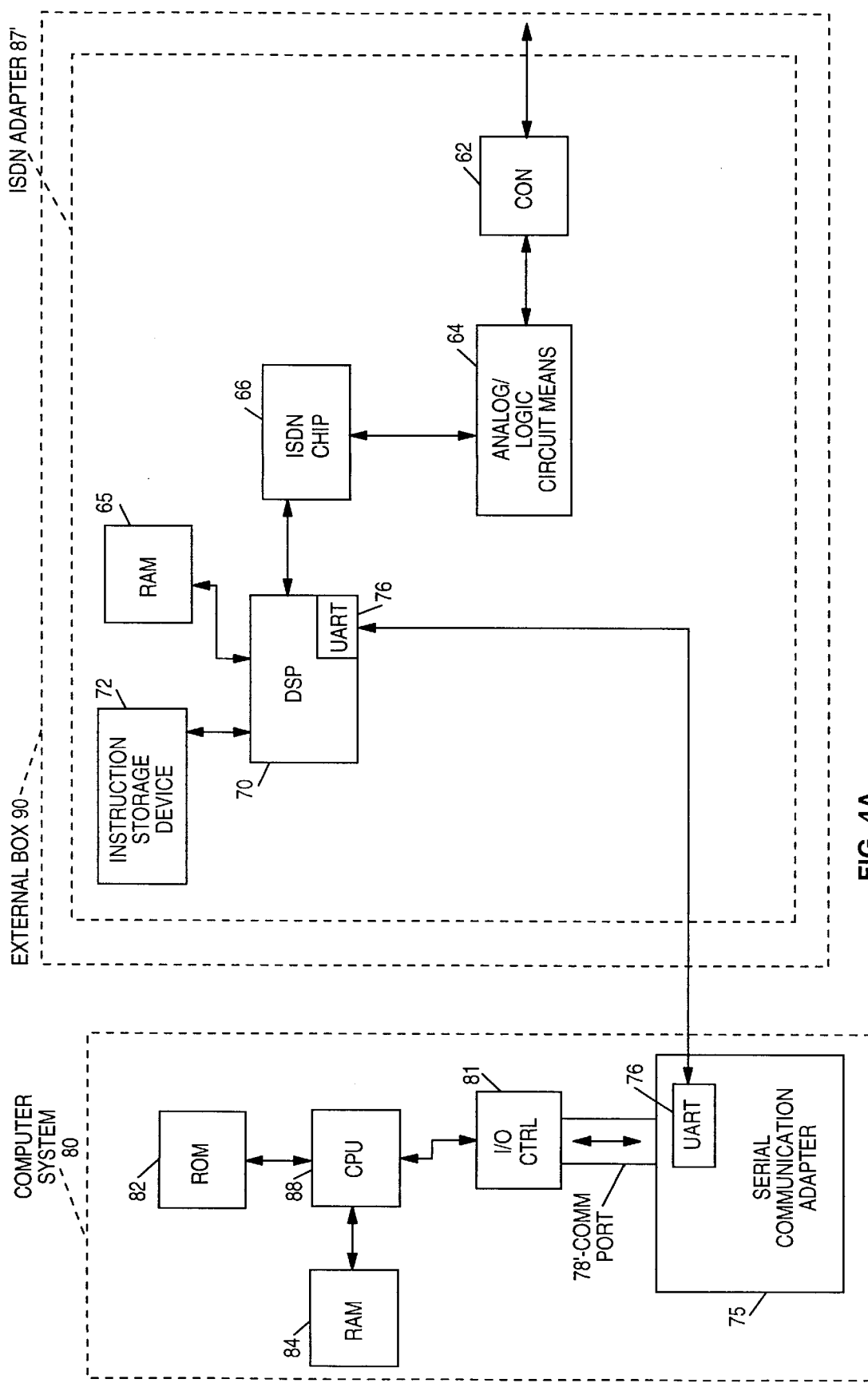

FIG. 4 shows a partial block diagram of computer system 80 showing the portions of said system which are necessary to practice the present invention. For clarity and simplicity, components of the computer system which are not necessary to practice the invention are omitted. To this end, the system in FIG. 4 shows the PC system bus 86 with an adapter 87 coupled to the PC system bus. The ISDN adapter 87 performs the functions which are necessary to enable an asynchronous station such as station A (FIG. 2) to communicate with synchronous station B. On the system side of the PC bus 86, CPU 88 is coupled to the bus. CPU 88 is coupled to RAM 84 and ROM 82. The ROM 82 stores programs which control the CPU 88 while the RAM 84 stores data. The CPU is also coupled to I/O controller 80. The I/O controller 80 and the CPU 88 keep track of an address block that data is inserted for COMM port 78 which includes the I/O controller and UART 76. The UART 76 is embedded in digital signal processor (DSP) 70 and compatible with off-the-shelf modules such as UART 16555 which are well known. The digital signal processor can be any of the off-the-shelf processors available. In a particular implementation, the MWAVE® digital signal processor was used.

The digital signal processor 70 is connected by bus interface controller (BUS INT CTRL) 74 to the PC bus 86. The bus interface controller performs hand shaking functions necessary to allow data transfer through the COMM PORT. An Instruction storage device 72 (which could include a ROM) for storing programs which control the DSP 70 is connected to the DSP. Likewise, RAM 68 for storing data is coupled to the DSP 70. The DSP is connected over appropriate conductors to integrated services digital network (ISDN) chip 66. The ISDN chip 66 is operatively coupled over appropriate conductor to analog/logic circuit means 64. The analog/logic circuit means 64 is connected to connector 62 whose output is to the transmission link which connects the adapter and the associated PC to an ISDN network.

Still referring to FIG. 4, a message generated by an application program running in CPU 88 is transmitted through the COMM port (including I/O controller 80, UART 76) processed in accordance with the teachings of the present invention and is delivered to the ISDN chip 66 which The chip 66 provides one or more of the following ISDN standard interfaces S or T or U. The analog/logic circuit means 64 provides over voltage protection, impedance matching, etc. The connector 62 is the ISDN standard connector RJ45.

FIG. 4A shows a block diagram for the alternate embodiment shown in FIG. 3A. In FIG. 4A COMM Port 78', serial communication adapter and UART 76' are mounted under the covers of computer system 80. The ISDN adapter 87' is mounted in extended box 90. The external box 90 and the computer system 80 are interconnected by cable.

Figure 5C:
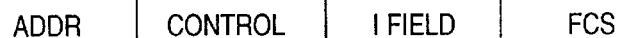
Figure 5D:
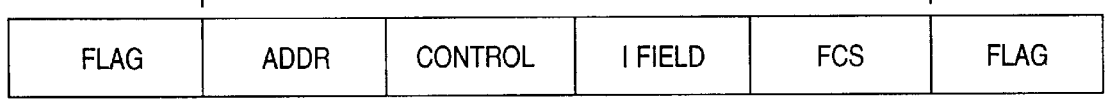
Figure 5E:
Figure 7:
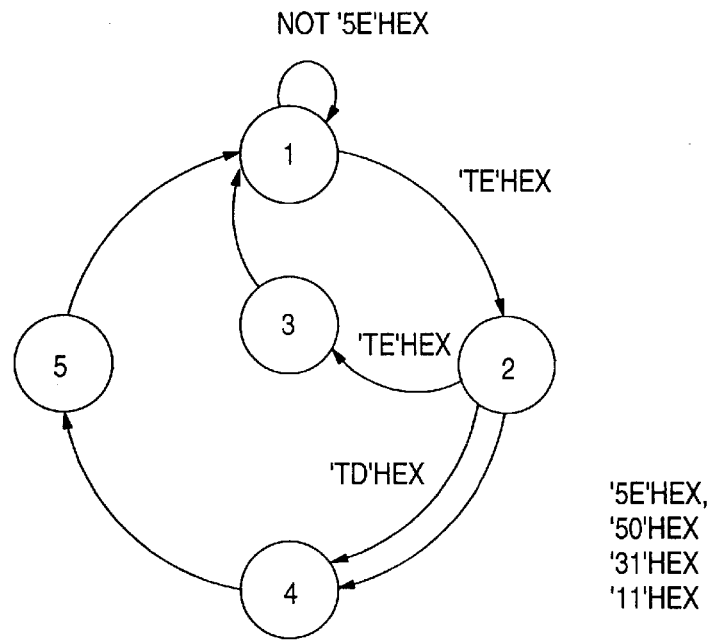
FIG. 7 shows a state machine for formatting frames in the transmit channel of the adapter.

FIG. 7 shows a state machine for a control program running in DSP 70 which implements the ADLC Task to format the frame in accordance with FIG. 5C. Before describing the state machine used for transmitting a frame, the pattern which is being sought will be identified. For purposes of discussion, it is assumed that station A is transmitting a frame to a peer station B. The ADLC Task A" receiving the frame from the COMM port examines the frame between the two flag sequences. Table A below sets forth four octet sequences which the ADLC Task looks for and converts them before sending the packet to B MAC Task (sync framer A") FIG. 2.

TABLE A

| Sequence | Conversion |
| --- | --- |
| '7D5D' Hex | '7D' Hex |
| '7D5E' Hex | '7E' Hex |
| '7D33' Hex | '13' Hex |
| '7D31' Hex | '11' Hex |
| '7DXX' Hex | Abort Packet |

XX represents all patterns other than previous four pattern. The Sequences and conversations are in Hexadecimal notation. A flag byte is a "7E" Hex octet. A transparency byte is '7D' Hex. When the frame contains flag characters, the conversion is performed to prevent the false detection of the end of frame condition. When the frame contains a transparency character or other control character such as '13' Hex or '11' Hex, it must also be converted to prevent a false transparency conversion or aborted frame.

Returning now to FIG. 7, a description of the state diagram will now be given. By programming the DSP 70 (FIGS. 3 and 4) in accordance with the teachings below, the present invention is realized.

| State | Description |
| --- | --- |
| I | When the DSP 70 is in state I, examine the next octet from the serial port. If the next octet is '7E' Hex, go to state II and discard the octet. |
| II | Examine the next octet from the serial port. If octet eguals '7E' Hex, go to state III and discard the octet. If equals '7D' Hex, go to state 4 and discard the octet. Else append the octet to the accumulating packet. |
| III | Deliver the accumulated packet to the HDLC framer and go to state I. |
| IV | Examine the next octet from the serial port. If octet equals '5E' Hex, append '7E' Hex octet to the accumulating packet and go to state II. If octet equals '5D' Hex, append '7D' Hex octet to the accumulating packet and go to state II. If octet equals '31' Hex, append '11' Hex octet to the accumulating packet and go to state II. If octet equals '33' Hex, append '13' Hex octet to the accumulating packet and go to state II. |
| Else | go to state V. |
| V | Discard the accumulated packet and go to state I. |

Figure 8:
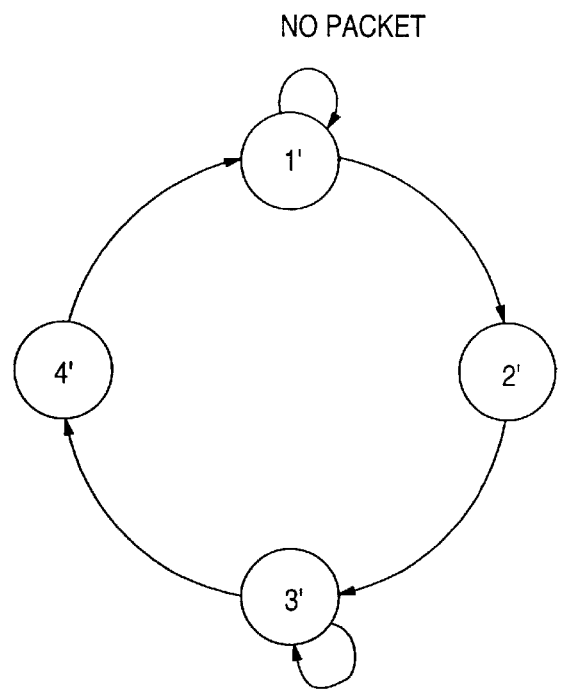
FIG. 8 shows a state machine for formulating data in the receive channel of the adapter.
Figure 9:
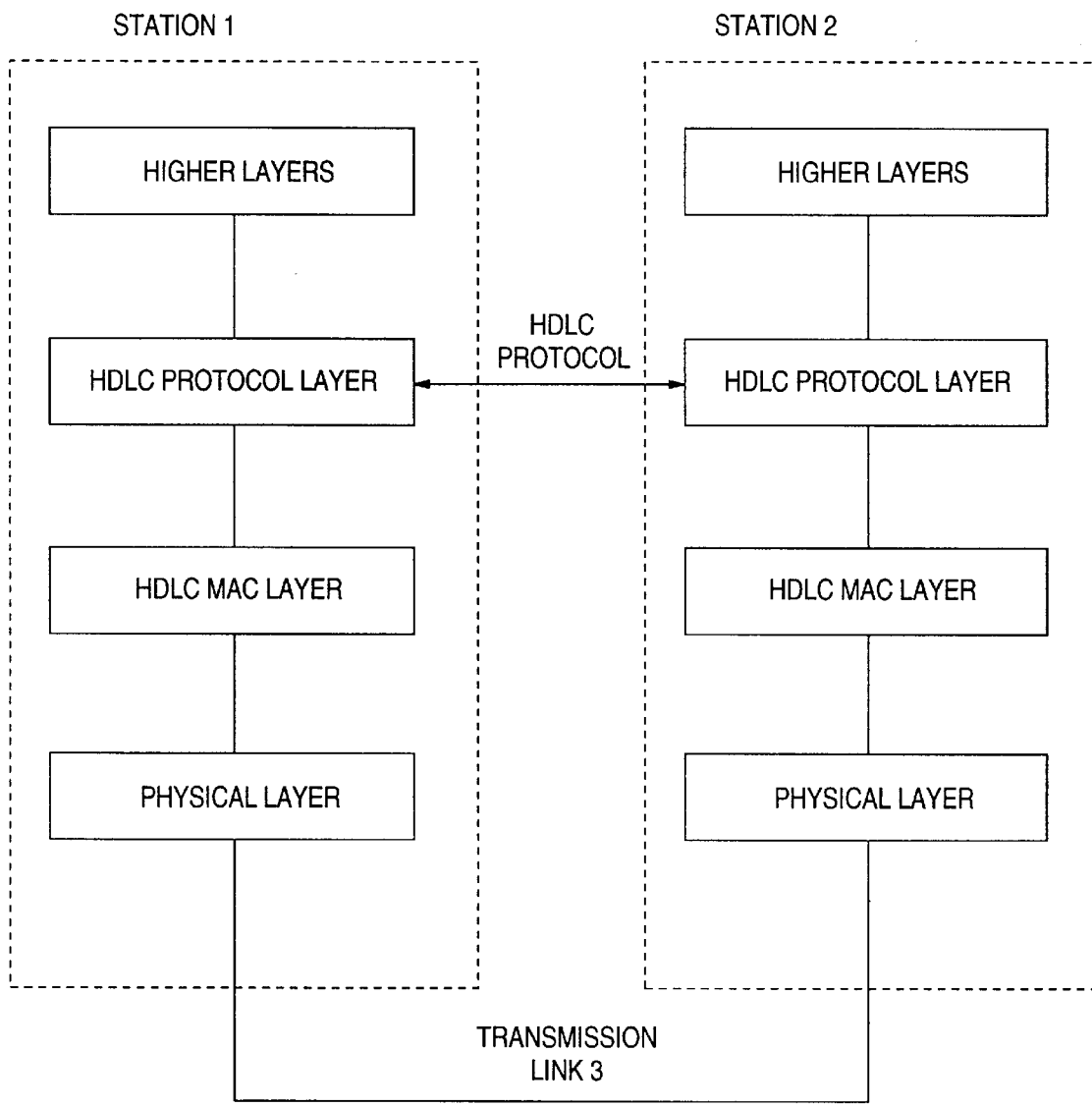
FIG. 9 shows a prior art balanced system in which a synchronous (HDLC) station communications with a synchronous (HDLC) station.
Figure 10:
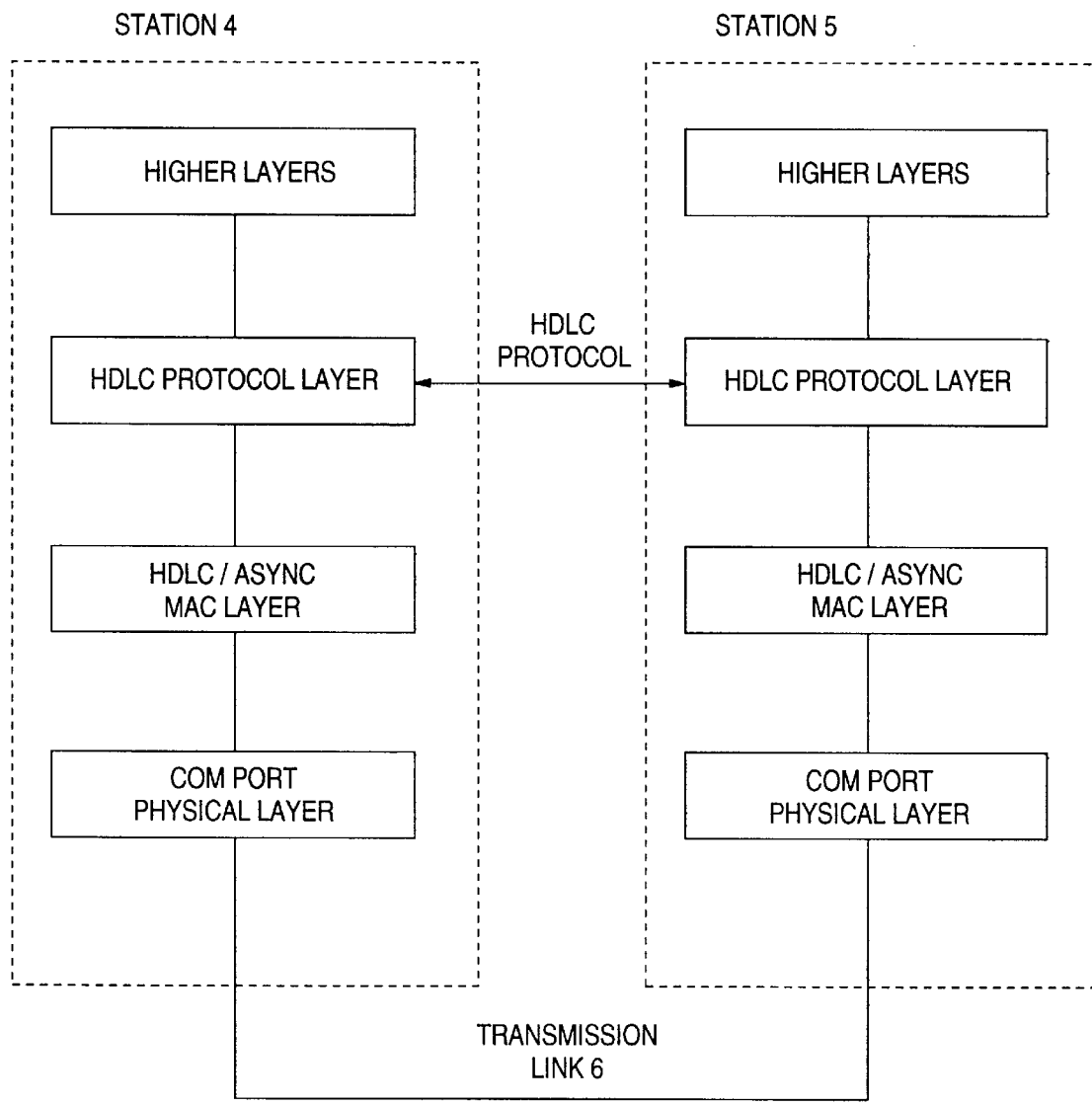
FIG. 10 shows a prior art balanced system in which an HDLC/Async station communicates with an HDLC/Async station.

FIG. 8 shows a state machine for frames received from the synchronous framer transmitted from peer station B (FIG. 2). The ADLC task examines a packet delivered by the HDLC framer. Four octet sequences are detected and converted. Table B below shows the sequences to be detected and the pattern to be inserted for each detected sequence.

TABLE B

| Sequence | Conversion |
| --- | --- |
| '5E' Hex | '7D5D' Hex |
| '7E' Hex | '7D5E' Hex |
| '11' Hex | '7D31' Hex |
| '13' Hex | '7D33' Hex |

The above sequences and conversions are in Hexadecimal notation.

Turning again to FIG. 8, the operation of the state machine will now be described.

| State | Description |
| --- | --- |
| I' | Wait for HDLC framer to deliver packet. When packet is delivered, go to state II'. |
| II' | Send '7E' Hex to the serial port and go to state III'. |
| III' | Examine each octetin the packet. If octet equals '7E' Hex, send 0X7D5E to the serial port. If octet equals '7D1 Hex, send '7D5D' Hex to the serial port. If octet equals '11' Hex, send '7D31' Hex to the serial port. If octet equals '13' Hex, send '7D33' Hex to the serial port. Else send the octet to the serial port. When the last octet of the packet is processed, go to state IV'. |
| IV" | Send '7E' Hex to the serial port and go to state I. |

If the data being transmitted is a serial line internet protocol conversion, the Asynchronous Data Line Control (ADLC task) FIG. 2, examines the entire frame between the two FLAG sequences. Table C below identifies two octet sequences which have to be detected and, if found, converted before sending the packet to the BMAC Task A" of the HDLC framer.

TABLE C

| Sequence | Conversion |
| --- | --- |
| 'DBDC' Hex | 'CO' Hex |
| 'DBDD' Hex | 'DB' Hex |

A flag byte for this protocol is a 'CO' Hex octet. A transparency byte is a 'DB' Hex octet. The logic for a state machine to search and adjust the frame to comply with Table C is as follows.

| State | Description |
| --- | --- |
| I" | Examine next octet from the serial port. If octet equals 0XCO, go to state I'" and discard the Octet. If octet equals 0XDB, go to state II and discard the octet. Else append the octet to the accumulating packet and go to state III'". |
| II" | Examine next octet from the serial port. If octet = 0XDD, go to state III" and append 0XDB to the accumulating packet. If octet 0XDC, go to state III" and append 0XCO to accumulating packet. Else append the octet to the accumulating packet and go to state III". |
| III" | Examine next octet from the serial port. If octet equals 0XCO, deliver the accumulated packet to the BMAC Task A" of the HDLC framer and go to state I". If octet equals 0XDB, go to state II" and disregard the octet. Else append the octet to the accumulated packet and go to state III". |

In receiving data with the internet protocol conversion, the ADLC task, examines the packet delivered by the HDLC framer.

The Table D below sets forth two octet sequences which the ADLC task searches to detect and the conversion for each when detected.

TABLE D

| Sequence | Conversion |
| --- | --- |
| 'CO' Hex | 'DBDC' Hex |
| 'DB' Hex | 'DBDD' Hex |

| State | Description |
| --- | --- |
| II''' | Wait for HDLC framer to deliver a packet. When packet is delivered, go to state II'''. |
| III''' | Send 0XCO to the serial port and go to state III'''. |
| III''' | Examine each octet in the delivered packet. If octet equals 0XCO, send 0XDBDC to the serial port. If octet equals 0XDBf send 0XDBDD to the serial port. Else send the octet to the serial port. When the end of the delivered packet is reached, go to state IV'''. |
| IV''' | Send 0XCO to the serial port and go to state I. |

For some configurations, additional header and trailer octets may be added to the packet before delivery to the HDLC Framer. Conversely, header and trailer octets may be removed before octets from a delivered HDLC packet on frame are sent to the serial port. This concludes the detailed description of the present invention.

Although a preferred embodiment of the present invention has been described and disclosed in detail, other modifications and embodiments (such as implementations in wide area network the analog telephone network or other digital network including switch 56) thereof which would be apparent to one having ordinary skills are intended to be covered by the spirit and scope of the appended claims.

I claim:

1. In a communications network having at least two stations, with one of said two stations being able to communicate asynchronously while the other station being able to communicate synchronously and each station having a system unit coupled to a communications device, interconnected by a transmission network a device for incorporating in the one of said two stations communicating asynchronously so that said one of said two stations communicating asynchronously can communicate with the other station communicating synchronously, said device comprising:

an interface means disposed between the system unit and the communications device said interface means receiving data arranged on byte boundaries from the system unit and passing said data asynchronously to the communications device, a first means for receiving a frame from an application program being executed on the one of said two stations communicating asynchronously and for modifying said frame to allow transmission through the interface means; and a second means for receiving the frame from the interface means, adjusting selected portion of information added by the first means and adding information which makes the frame compatible for transmission, using a synchronous protocol, through the transmission network to the other station which communicates synchronously.

2. In a communications network having at least two stations, with one of said two stations being able to communicate asynchronously and the other station being able to communicate synchronously, interconnected by a transmission network a device for incorporating in the one of said two stations communicating asynchronously so that said one of said two stations communicating asynchronously can communicate with the other station communicating synchronously, said device comprising:

a COMM port located in the one of said two stations communicating asynchronously;

a first means for receiving synchronous frames from synchronous application programs being executed on the one of said two stations communicating asynchronously and for modifying said synchronous frames to allow transmission through the COMM port; and a second means for receiving modified frames from the COMM port, searching the frame for sequences of predetermined bit patterns and substituting different sequences of bit patterns which makes the frame compatible for transmission, using a synchronous protocol, through the transmission network to the other station which communicates synchronously.

3. The device of claim 2 wherein modification to the frames received from the application programs by the first means includes encapsulating the frame with a pair of flag fields, with each flag field containing a first set of predetermined bits and inserting one or more "0" bits in information contained between the flag fields so that the set of predetermined bits is not repeated in the information contained between the flag fields.

* * * * *